(12) United States Patent
Sawada

(10) Patent No.: US 8,115,818 B2
(45) Date of Patent: Feb. 14, 2012

(54) IMAGING DEVICE AND IMAGE PROCESSING METHOD OF SAME

(75) Inventor: Ryuuichi Sawada, Tokyo (JP)

(73) Assignee: Kyocera Corporation, Kyoto (JP)

( * ) Notice: Subject to any disclaimer, the term of this patent is extended or adjusted under 35 U.S.C. 154(b) by 332 days.

(21) Appl. No.: 12/159,587

(22) PCT Filed: Dec. 15, 2006

(86) PCT No.: PCT/JP2006/325061
§ 371 (c)(1),
(2), (4) Date: Aug. 20, 2009

(87) PCT Pub. No.: WO2007/077719
PCT Pub. Date: Jul. 12, 2007

(65) Prior Publication Data
US 2010/0026823 A1    Feb. 4, 2010

(30) Foreign Application Priority Data

Dec. 27, 2005  (JP) ................................ 2005-376663
May 30, 2006  (JP) ................................ 2006-150689
May 30, 2006  (JP) ................................ 2006-150690

(51) Int. Cl.
*H04N 5/225*    (2006.01)

(52) U.S. Cl. .......... 348/208.13; 348/208.12; 348/208.99

(58) Field of Classification Search . 348/208.99–208.16
See application file for complete search history.

(56) References Cited

U.S. PATENT DOCUMENTS

| 6,466,253 | B1 * | 10/2002 | Honjoh | 348/36 |
| 6,801,248 | B1 * | 10/2004 | Horiuchi | 348/208.13 |
| 7,092,019 | B1 * | 8/2006 | Ogata et al. | 348/263 |
| 7,095,434 | B1 * | 8/2006 | Ikeda | 348/219.1 |
| 7,301,563 | B1 * | 11/2007 | Kakinuma et al. | 348/208.13 |
| 2004/0062450 | A1 * | 4/2004 | Kondo et al. | 382/266 |
| 2005/0219642 | A1 * | 10/2005 | Yachida et al. | 358/448 |

FOREIGN PATENT DOCUMENTS

| JP | 10-108079 | 4/1998 |
| JP | 2000-050173 | 2/2000 |
| JP | 2000-341582 | 12/2000 |
| JP | 2002-190983 | 7/2002 |
| JP | 2003-009006 | 1/2003 |
| JP | 2004-229259 | 8/2004 |

* cited by examiner

*Primary Examiner* — Sinh Tran
*Assistant Examiner* — Christopher K Peterson
(74) *Attorney, Agent, or Firm* — DLA Piper LLP (US)

(57) ABSTRACT

An imaging device and its image processing for creating an image with less blur from a small number of images under different exposure conditions in a shortened processing time. The imaging device 10 captures an image by means of an optical system 11 and an imaging element 12 in a short exposure time with a high resolution and much noise and images in a long exposure time with low resolution and less noise. After signal processing by signal processing section 13, a CPU 14 detects the position variation between captured images and blurs, separates the edges blur and the noise by using the threshold from the two difference images, combines the two images at a varied combination ratio, and thereby creates an image with no blur and reduced noise.

17 Claims, 8 Drawing Sheets

FIG. 1
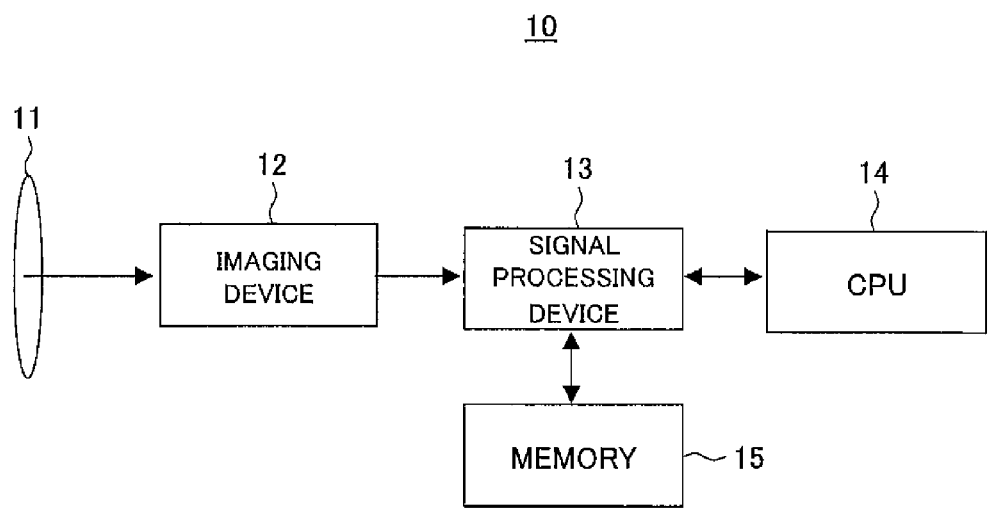
FIG. 2A  FIG. 2B  FIG. 2C
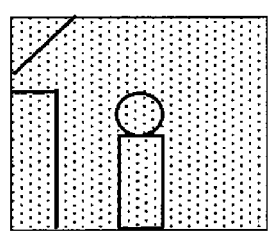 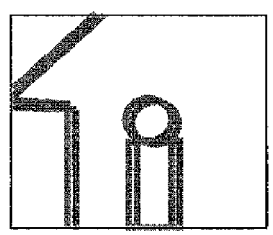 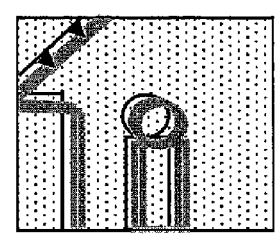
IMAGES CAPTURED BY DIFFERENT EXPOSURE CONDITIONS

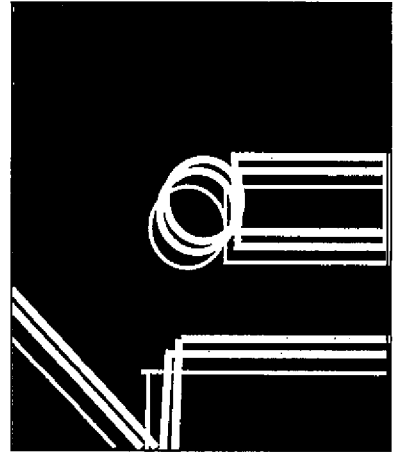

FIG. 3A

SHORT TIME EXPOSURE: SENSITIVITY OF CCD IS HIGH AND NOISE IS LARGE, BUT RESOLUTION IS GOOD

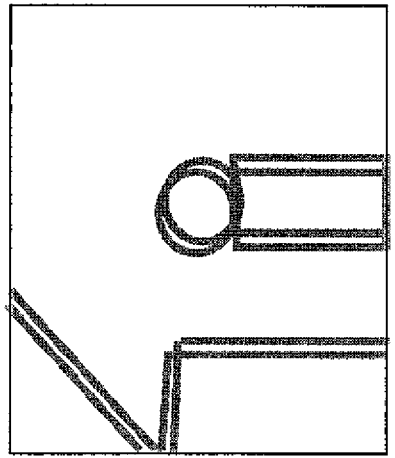

FIG. 3B

LONG TIME EXPOSURE: SENSITIVITY OF CCD IS LOW AND NOISE IS SMALL, BUT RESOLUTION IS BAD

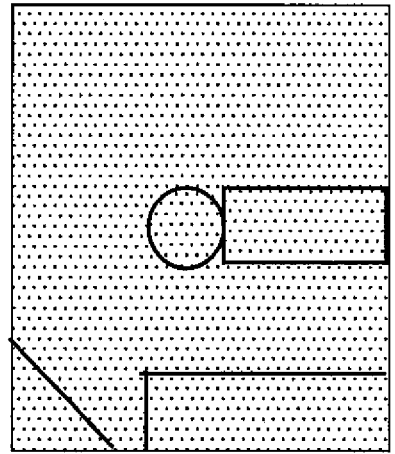

FIG. 3C

DIFFERENCE IMAGE OF SHORT TIME EXPOSURE – LONG TIME EXPOSURE: IMAGE IN WHICH EDGE PORTION OF OBJECT AND SHAKING AND NOISE APPEAR

DIFFERENCE IMAGE OF IMAGES CAPTURED BY DIFFERENT EXPOSURE CONDITIONS

FIG. 4A
FIG. 4B
FIG. 4C
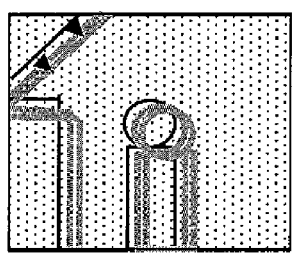
BEFORE IMAGE PROCESSING
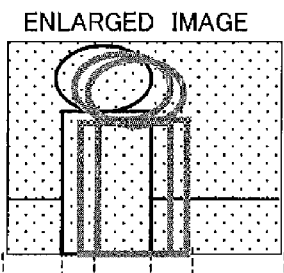
ENLARGED IMAGE
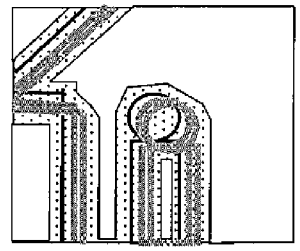
OUTPUT IMAGE
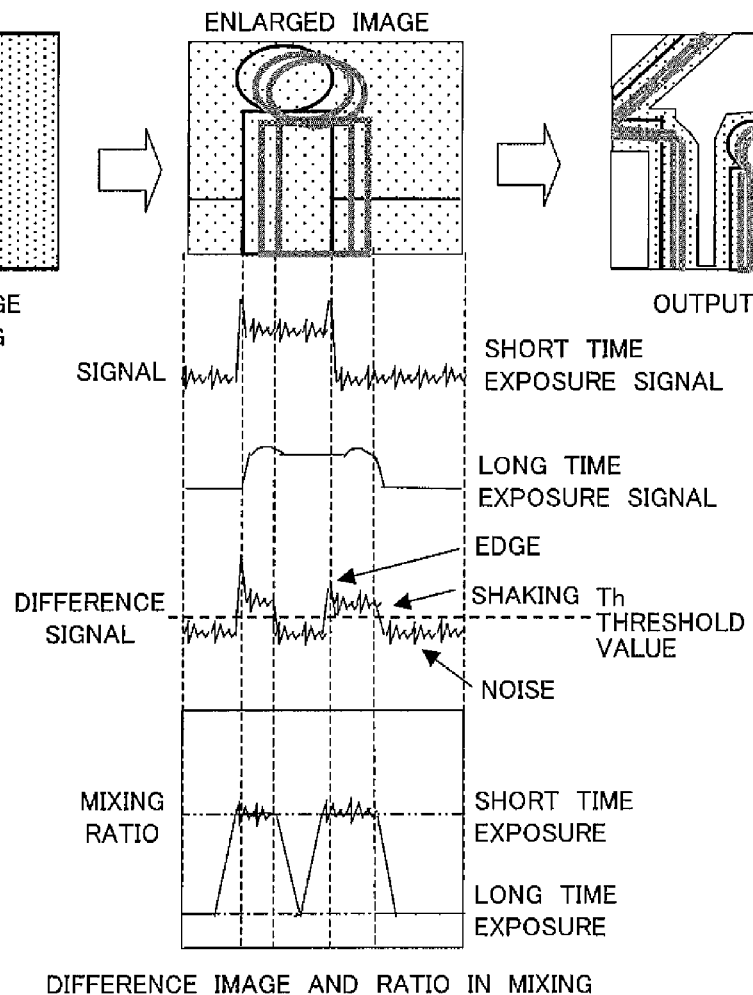
DIFFERENCE IMAGE AND RATIO IN MIXING

IMAGING DEVICE AND IMAGE PROCESSING METHOD OF SAME

CROSS REFERENCE TO RELATED APPLICATION

This application is a national stage of International Application No. PCT/JP2006/325061 filed on Dec. 15, 2006, and claims the benefit of priority under 35 USC 119 of Japanese Patent Application No. 2005-376663 filed on Dec. 27, 2005, Japanese Patent Application No. 2006-150689 filed on May 30, 2006 and Japanese Patent Application No. 2006-150690 filed on May 30, 2006 which are incorporated herein by reference.

TECHNICAL FIELD

The present invention relates to an imaging device able to reduce noises by mixing captured images and an image processing method for the same.

BACKGROUND ART

In recent years, imaging devices such as cameras have been made increasingly smaller in size. Attention is now being focused on technology for correcting the "hand shake" phenomenon.

Due to the smaller sizes of cameras, the holdability drops at the time of taking a picture. Further, the degree of freedom is increased in comparison with conventional type of photography such as with the one-handed shooting in the method of taking a picture by a camera mounted in a mobile phone.

When taking a picture, when taking the picture by various methods or in a state with no stability in this way, the camera shakes when depressing the shutter button and hand shake occurs.

For example, in the case of taking a picture under dark conditions where the exposure time is long, the shutter speed becomes slow and the camera ends up shaking in many cases.

Further, in a case of taking a picture by raising the sensitivity under the exposure conditions to shorten the exposure time, noise ends up being superposed and the image becomes rough.

In order to solve this problem, devices correcting such hand shake are being mounted on single-lens reflex cameras and, recently, on compact cameras as well.

For example, an optical type hand shake correction device inclining the lens to match with the shaking for correcting the hand shake is being commercialized, but if considering the reduction in size in recent years and the mounting of such devices in mobile phone cameras, this would be very difficult in terms of space.

Further, as another method, various types of imaging devices able to obtain an image free from shaking by image processing from a plurality of images are being proposed (see for example Patent Document 1).

Patent Document 1: Japanese Patent Publication (A) No. 10-108079

DISCLOSURE OF THE INVENTION

Problem to be Solved by the Invention

However, in the conventionally proposed imaging devices, there is the disadvantage that a memory for holding several images becomes necessary, so the devices end up becoming expensive.

Further, there is the disadvantage that along with the increase in the number of pictures taken, the processing time ends up becoming longer in order to correct the positional deviation between images occurring between images captured.

The present invention provides an imaging device able to obtain an image free from shaking and suppressing noise by a small number of images of different exposure conditions and able to shorten the processing time and an image processing method of the same.

Means for Solving the Problem

A first aspect of the present invention is an imaging device having a function of mixing a plurality of images captured under different exposure conditions, having a detecting means for detecting positional deviations and amounts of shaking among the plurality of images, and a mixing means for taking a difference of pixels from a first image and a second image corrected in positional deviation based on detection results of the detecting means and judging the related pixel as an edge of the image and raising a mixing ratio of the first image when the difference value exceeds a threshold value set in advance and lowering the mixing ratio of the first image when the difference value is the threshold value or less for mixing the images.

Preferably, at least one among the plurality of images to be mixed includes an image having noise and a high resolution.

Preferably, at least one among the plurality of images to be mixed includes an image having a low resolution, but having little noise.

Preferably, the threshold value set in the mixing means can be changed according to a gain magnification with respect to an image signal determined from the exposure conditions when capturing the image.

Preferably, the mixing means mixes images based V on at least a G component in data of output of the imaging element.

Preferably, the mixing means mixes images based on at least a luminance signal among a luminance signal Y and color difference signals U and V.

Preferably, the detecting means extracts positional deviations and amounts of shaking among images from a difference image of a plurality of images.

Preferably, the mixing means makes the ratio of the image exposed for a long time and having little noise larger according to an increase of a distance from the edge and sets an edge portion so that the ratio of the image exposed for a short time and having a high resolution becomes larger.

Preferably, the mixing means mixes images by increasing the ratio of the short time exposed image when the distance from the edge is shorter than a distance set in advance.

Preferably, the mixing means mixes images by increasing the ratio of the long time exposed image when the distance from the edge is longer than a distance set in advance.

Preferably, the mixing means takes a difference for each pixel from the first image and the second image corrected in the positional deviation and judges that pixel as the edge of the image and raises the mixing ratio of the first image when the value for each pixel exceeds the threshold value determined concerned with the output level of the related pixel of the first image and raises the mixing ratio of the second image when the value for each pixel is the threshold value or less for mixing the images, and the first image includes an image having noise, but having a high resolution.

Preferably, the mixing means raises the ratio of the second image of the long time exposure according to the increase of the distance from the edge and sets the edge portion so that the ratio of the first image of the short time exposure becomes large.

Preferably, the mixing means raises the ratio of the first image to mix the images when the distance from the edge is shorter than a distance set in advance.

Preferably, the mixing means raises the ratio of the second image to mix the images when the distance from the edge is longer than a distance set in advance.

A third aspect of the present invention is an imaging method for mixing a plurality of images captured under different exposure conditions, including a first step of detecting positional deviations and amounts of shaking among the plurality of images, a second step of taking a difference of pixels from the first image and the second image corrected in positional deviation based on the detection results, a third step of comparing the difference value and a threshold value set in advance, judging the related pixel as an edge of the image when the difference value exceeds the threshold value and raising the mixing ratio of the first image when the difference value exceeds the threshold value, and setting the mixing ratio of the first image low when the difference value is the threshold value or less, and a fourth step of mixing images with the ratio set at the third step.

A fourth aspect of the present invention is an imaging method for mixing a plurality of images captured under different exposure conditions, including a first step of detecting and correcting positional deviations and amounts of shaking among the plurality of images, and a second step of mixing each plurality of images corrected in positional deviation based on the detection results, wherein the second step includes a step of taking a difference for each pixel from the first image and the second image corrected in positional deviation, a step of judging that pixel to be an edge of the image and raising the mixing ratio of the first image to mix the images when the value for each pixel exceeds a threshold value determined relating to the output level of that pixel of the first image, and a step of raising the mixing ratio of the second image to mix the images when the value for each pixel is the threshold value or more, the first image including an image having noise, but having a high resolution.

Effects of the Invention

According to the present invention, an image having no shaking and suppressing noise can be obtained by a small number of images under different exposure conditions, and the processing time can be shortened.

BRIEF DESCRIPTION OF THE DRAWINGS

[FIG. 1] FIG. 1 is a block diagram showing an imaging device according to a first embodiment of the present invention.

[FIG. 2] FIG. 2A to FIG. 2C are diagrams showing examples of a plurality of images captured under different exposure conditions.

[FIG. 3] FIG. 3A to FIG. 3C are diagrams showing an image of a Y signal component captured by short time exposure, an image of the Y signal component captured by long time exposure, and a difference image of Y signal components of a plurality of images.

[FIG. 4] FIG. 4A to FIG. 4C are diagrams showing relationships between the difference image and the ratio in the mixing in the first embodiment.

FIG. 5 is a flow chart for explaining an operation of a first embodiment of the present invention.

FIG. 6 is a block diagram showing an imaging device according to a second embodiment of the present invention.

FIG. 7A to FIG. 7C are diagrams showing relationships between the difference image and the ratio in the mixing in the second embodiment.

FIG. 8 is a diagram showing an example of a case where there are a dark portion and a bright portion in the image such as the sun and shade.

FIG. 9 is a flow chart for explaining the operation of the second embodiment of the present invention.

Figure 5:
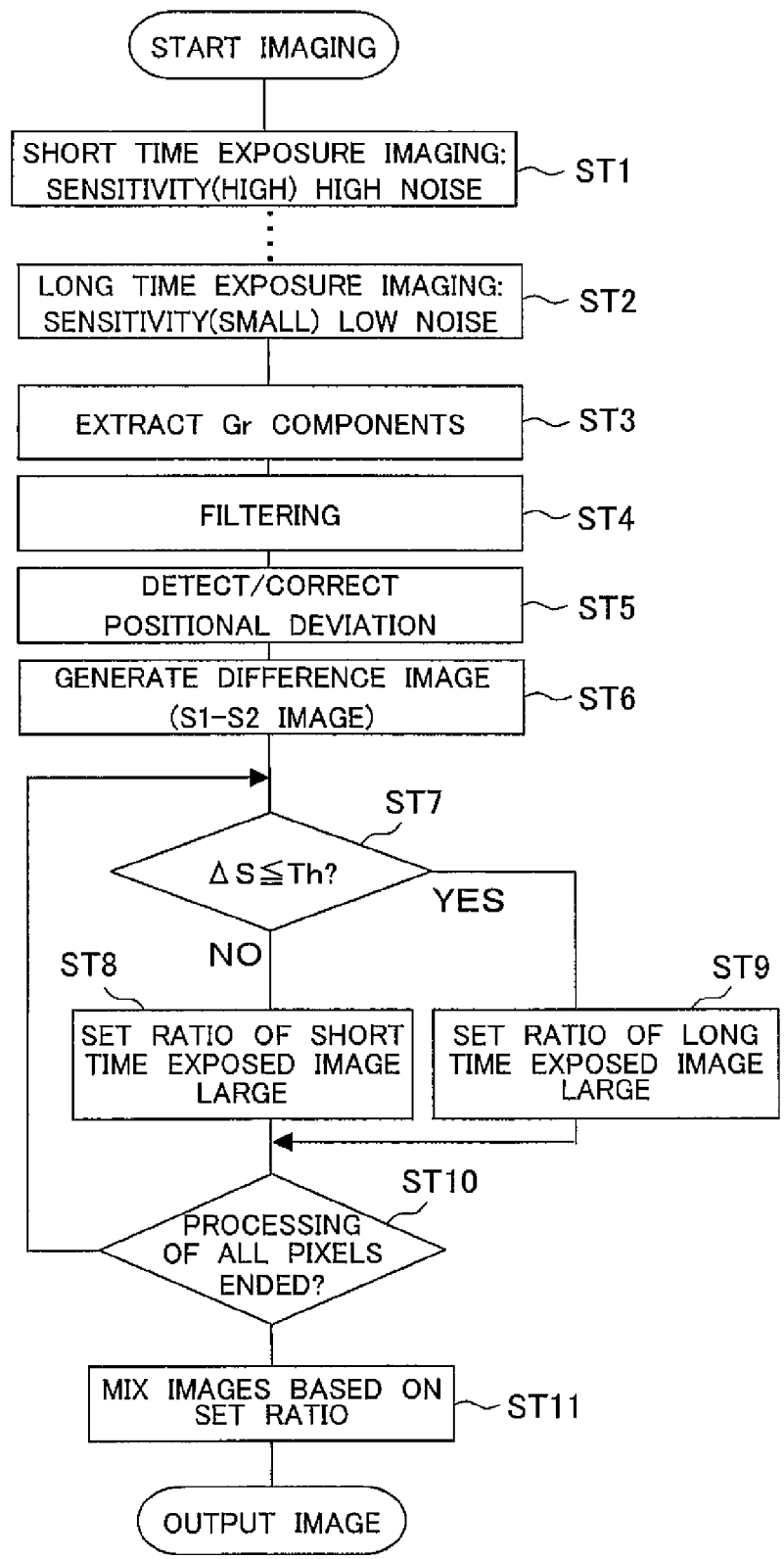
[FIG. 5]

DESCRIPTION OF NOTATIONS 10, 10A . . . imaging device, 11 . . . optical system, 12 . . . imaging element, 13 . . . signal processing unit, 14, 14A . . . CPU, and 15 . . . memory.

BEST MODE FOR CARRYING OUT THE INVENTION

Below, embodiments of the present invention will be explained with reference to the drawings.

FIG. 1 is a block diagram showing an imaging device according to a first embodiment of the present invention.

The present imaging device 10 has an optical system 11, an imaging element 12, a signal processing unit 13, a CPU 14 as control and processing unit, and a memory 15.

The imaging device 10 of the first embodiment has a function of capturing a plurality of images including an image having a short exposure time and a high resolution, but having much noise and an image having a long exposure time and a low resolution, but having little noise.

Furthermore, the imaging device 10 has a function of detecting the positional deviations and amounts of shaking between the captured images, taking a difference of pixels between a first image of a short exposure time and a second image of a long exposure time corrected in positional deviation based on this detection result, judging this pixel as an edge of the image and raising the mixing ratio of the first image when this difference value exceeds a threshold value set in advance, and lowering the mixing ratio of the first mixing (raising the mixing ratio of the second image) to mix the images when the difference value is the threshold value or less to thereby to form an image free from shaking and reducing noise.

The mixing processing of the present embodiment can be carried out with respect to the output (RAW data) of an RGB Beyer pattern from a sensor and can be applied to a case where the luminance signal Y in a YUV (Y is the luminance signal, and U and V are color difference signals) format after the signal processing of the captured image is used for the image mixing as well.

The imaging element 12 is formed by a CCD or CMOS sensor etc., receives an optical image of an object passing through the optical system 11, converts this photo-electrically, and supplies the result to the signal processing unit 13. In the following description, an explanation will be given assuming that the imaging element 12 is formed by a CCD.

The optical system 11 and the imaging element 12 of the present embodiment can perform a long time exposure capturing operation in a state where a CCD sensitivity is low, that is, the noise is small, but a shutter speed is slow and a capturing operation having much noise, but having a short exposure time by changing the CCD sensitivity under for example control of the CPU 14.

The signal processing unit 13 performs color interpolation, white balancing, YUV conversion processing, compression, filtering, and other processing and store images in the memory 15 etc.

The signal processing unit 13 of the present embodiment has a function of extracting luminance signal components from imaging data in the optical system 11 and the imaging element 12 and a filtering function of eliminating the noise components of the luminance signal Y. The filtering is carried out with a filter coefficient for reducing the noise components without lowering the resolution. In the filtering, as general processing, a median filter, an edge preservation filter, etc. can be applied.

The signal processing unit 13 stores the image after the filtering in accordance with each imaging data in the memory 15.

The CPU 14 performs the exposure control and, at the same time, has operation inputs of a not shown operation portion etc., determines the operation of the entire system in accordance with those inputs, controls the optical system 11, imaging element 12, signal processing unit 13, etc., and conducts mediation control of the entire system.

Further, the CPU 14 has a function of detecting positional deviations and amounts of shaking among captured images based on the data after the signal processing by the signal processing unit 13 stored in the memory 13 and mixing images while changing ratios of images in accordance with the comparison results between the difference of the first image and the second image and the threshold value to thereby form an image having no shaking and reducing the noise.

More concretely, the CPU 14 has a detection function of detecting positional deviations and amounts of shaking among a plurality of images captured under different exposure conditions and a mixing function of taking the difference of pixels between a first image of a short exposure time and a second image of a long exposure time corrected in positional deviation based on the detection results of the detection function, judging this pixel as an edge of the image and raising the mixing ratio of the first image when this difference value exceeds a threshold value set in advance, and raising the mixing ratio of the second image to mix the images when the difference value is the threshold value or less.

The CPU 14 extracts Gr components from the RAW pixel data of the captured plurality of images and takes the difference and separates the edge and/or shaking components and noise components from this difference image according to a threshold value.

The CPU 14, in for example the correction function, calculates an absolute value of a difference image of images (short time exposed image S1—long time exposed image S2) subjected to the correction processing of the positional deviation.

This image is obtained by subtracting the image of a long time exposure and having shaking from the short time exposed image, therefore an image of edges including noise and shaking will be generated.

The CPU 14 makes the ratio of the image of the long time exposure and having little noise larger according to the increase of the distance from an edge and sets the edge portion so that the ratio of the image of the short time exposure and having a high resolution becomes larger.

For example, the ratio of the image of the short time exposure may be set at 100% in an edge portion, the ratio of the image of the long time exposure may be stepwise raised according to the distance from the edge, and a 50% ratio each may be given to the two at the noise portion.

Furthermore, the CPU 14 raises the ratio of the short time exposed image to mix the images when the distance from the edge is shorter than a distance set in advance and raises the ratio of the long time exposed image to mix the images when the distance from the edge is longer than a distance set in advance.

The CPU 14 stores the image data after the processing in the memory 15.

Below, examples of the plurality of images captured under different exposure conditions, the reason for the use of at least the G(r) components in the RAW data as the output of the imaging element for the mixing of images, and so on will be explained in further detail.

FIG. 2A to FIG. 2C are diagrams showing two images captured under different exposure conditions and an example of the image formed by mixing these.

FIG. 2A shows an image having a short exposure time and no shaking, but having much noise since the sensitivity is high. For example, it was captured in a state where the shutter speed was short (fast) and the sensitivity was high, therefore the resolution is high, but noise is superposed over the entire image since the sensitivity was raised.

FIG. 2B shows an image having a long exposure time and shaking, but having little noise since the sensitivity is low. For example, it was captured in a state where the shutter speed was long (slow) and the sensitivity was low, therefore the resolution is low and there is a possibility of occurrence of hand shake, but this is an image having little noise.

FIG. 2C is an image formed by mixing the images in FIG. 2A and FIG. 2B.

Even when a plurality of images are continuously captured, positional deviation occurs between capturing operations as shown in FIG. 2A to FIG. 2C.

FIG. 3A to FIG. 3C show images formed by extracting the Gr components from RAW image signals of the plurality of images captured as shown in FIG. 2 and taking the difference. In the RAW image signals, a gain of white balance is already applied with respect to R and B in an analog stage, therefore the R component and the B component have more noise in comparison with the G component. For this reason, in the present embodiment, the Gr components are extracted.

Note that the difference is taken by only the Gr components here, but it is also possible to take the difference for the other R, B, and Gb. In the present embodiment, the difference is taken after correcting positional deviations among the plurality of image capturing operations, so an image including edges and noise of short time exposure and shaking of long time exposure is formed. From this difference image, the edge and/or shaking components and the noise components are separated according to the threshold value Th.

In the present embodiment, from the difference image, a plurality of images are mixed with a ratio according to the distance from the edge based on the image having a high resolution, but having much noise.

FIG. 4A to FIG. 4C are diagrams showing relationships between the difference image and the ratio in the mixing in the first embodiment, in which FIG. 4A shows an image before the noise reduction processing, FIG. 4B shows an image formed by enlarging an object portion, and FIG. 4C shows an output image.

The edge portions of the difference image become as shown in the figures. Pixels neighboring the image do not change much, therefore an image having a relatively small change is formed when away from the edge by a predetermined distance or more.

From this fact, in the vicinity of an edge, as shown in FIG. 4B, the difference image becomes the image obtained by extracting the edge and noise of the short time exposure and the shaking of the long time exposure.

These are separated according to the threshold value Th set in advance. When the signal is larger than the threshold value Vth, it is judged as an edge and/or shaking, and the mixing ratio of the short time exposure is raised.

When the signal is smaller than the threshold value Th, it is judged as noise, and the mixing ratio of the long time exposure is set large. Furthermore, two images are mixed by setting the mixing ratios for individual pixels.

For example, in an image on which noise was superposed, for example, a wall or a uniform surface behind the object, the noise was remarkable and the image was uneven. However, by performing this processing, the noise can be reduced.

In the first embodiment, a plurality of images including an image of short time exposure and having a high resolution, but having much noise and an image of long time exposure, but having little noise and having a low resolution are captured. When detecting the positional deviations and shakings between capturing operations and mixing the images, a difference image of two images to be mixed is generated. From this image, edge components and shaking components and noise components of the two images are extracted. By separating the edge and/or shaking components and noise components from the difference image by using the threshold value Th and mixing the images while raising the ratio of the image of the short time exposure free from shaking in the portion judged as an edge or shaking and raising the ratio of the image of the long time exposure having little noise for portions other than the former, no shaking and noise reduction are achieved.

For example, the ratio of the image of the short time exposure may be set at 100% at the edge portion, the ratio of the image of the long time exposure may be stepwise raised according to the distance from the edge, and a 50% ratio each may be given to the long time exposed image and the short time exposed image in the noise portion.

Next, the operation by the above configuration will be explained with reference to the flow chart of FIG. 5.

First, under the control of the CPU 14, the optical system 11 and the imaging element 12 are driven for capturing an image. At step ST1, a short time exposure capturing operation is carried out in a state where the CCD sensitivity is high, that is, the noise is large, but the shutter speed is fast.

Next at step ST2, a capturing operation having little noise, but having a long exposure time is carried out by changing the CCD sensitivity.

At step ST3, the Gr components are extracted from the imaging data, and at step ST4, filtering eliminating the noise components of the signal is carried out. The filtering is carried out with a filter coefficient for reducing the noise components without lowering the resolution. As the filtering, the general ones include a median filter, an edge preservation filter, etc.

Next, at step ST5, the positional deviation of each image processed at step ST4 is detected and corrected. Here, the method of detecting and/or correcting the deviation is an issue.

At step ST6, a difference image of the images subjected to the positional deviation correction processing (short time exposed image S1—long time exposed image S2) is calculated. This image is obtained by subtracting the long time exposed image having shaking from the short time exposed image, therefore an image of the edges including noise and shaking will be generated.

At step ST7, a value $\Delta S$ of each pixel of the difference image and the set threshold value Th are compared. At step ST8, when $\Delta S$ is larger than Th, the mixing ratio of the short time exposure is set high. Conversely, when $\Delta S$ is smaller than Th, at step ST9, the mixing ratio of the long time exposure is set high.

At step ST10, this ratio is set for all pixels. At step ST11, the two images are mixed based on this ratio.

Note that the threshold value Th can be changed according to the gain magnification with respect to the image signal determined from the exposure conditions when capturing the image.

This means that the value of the threshold value Th is changed according to the gain magnification with respect to the signal of the sensor set at the time of the imaging.

In a dark object etc., the ISO sensitivity at the time of the imaging is set high, and the gain magnification with respect to the output of the sensor becomes high. The higher the gain, the larger the noise. Therefore, the separation threshold value of the edge and noise by the difference image is changed corresponding to the gain magnification.

Note that, in the first embodiment, the case where two images were mixed was explained, but three or more images may be mixed as well. For example, in the case of mixing three images, the ratio in the mixing may be set according to the distance from the edge in accordance with the exposure conditions of each.

As in the above explanation, according to the first embodiment, by separating the edges and/or shaking and noise by a difference image from a plurality of images captured under different exposure conditions and changing the mixing ratio according to a threshold value, a noise reduction effect can be achieved and imaging handling even positional deviation and shaking between captured images can be carried out. In contrast to the prior art, large effects are obtained, for example, reduction of the required memory capacity, shortening of the processing time, securing space for mounting parts, and reduction of costs.

Figure 6:
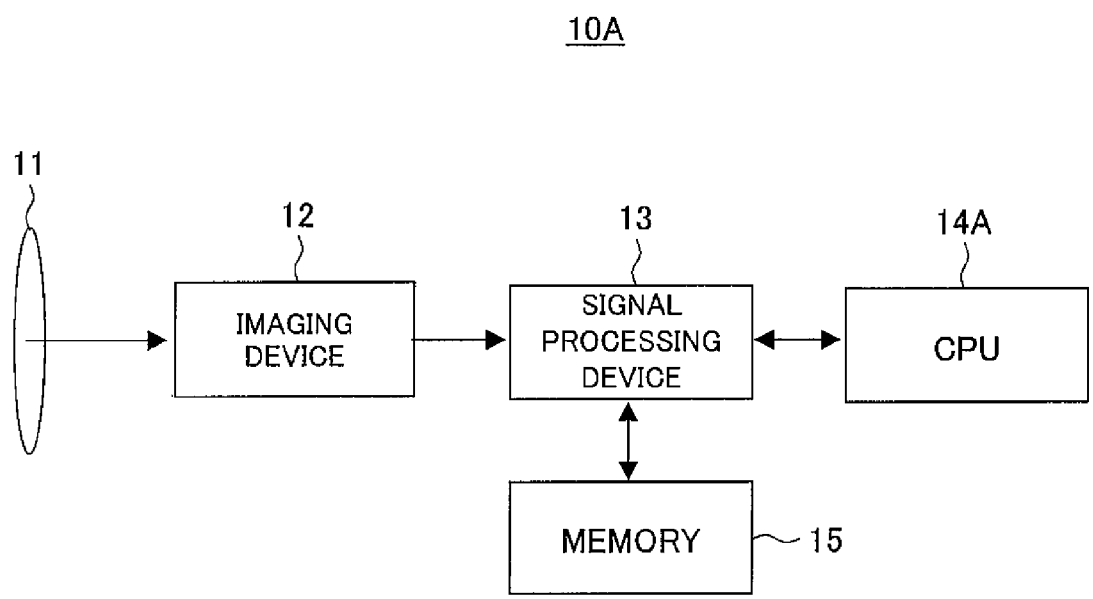
[FIG. 6]

FIG. 6 is a block diagram showing an imaging device according to a second embodiment of the present invention.

An imaging device 10A according to the second embodiment is the same as the imaging device 10 according to the first embodiment of FIG. 1 in its block configuration, but the processing of a CPU 14A includes mixing different from that of the CPU 14 of FIG. 1.

Namely, the CPU 14A according to the second embodiment has a correction function of detecting and correcting amounts of shaking among a plurality of images captured under different exposure conditions and a mixing function of taking a difference for each pixel from the first image and the second image corrected in the positional deviation, judging that pixel as an edge of the image and raising the mixing ratio of the first image when the value for each pixel exceeds the threshold value determined related to the output level of that pixel of the first image, and raising the mixing ratio of the second image when the value for each pixel is the threshold value or less for mixing the images.

Below, the imaging device 10A according to the second embodiment will be explained centered about the processing of the CPU 14A.

The CPU 14A controls the exposure and, at the same time, has operation inputs of a not shown operation portion etc., determines the operation of the entire system in accordance with those inputs, controls the optical system 11, imaging element 12, signal processing unit 13, etc., and conducts mediation control of the entire system.

Further, the CPU 14 generates a difference image of two images to be mixed when detecting and/or correcting positional deviations among captured images and mixing the images based on the data after the signal processing by the signal processing unit 13 stored in the memory 13. From this image, the edge components and shaking components and the noise components of the two images are extracted.

The CPU 14A separates the edge and/or shaking components and noise components from the difference image by using the threshold value Th and raises the ratio of the short time exposed image free from shaking for the portion judged as the edge or shaking and raises the ratio of the long time exposed image having little noise for portions other than the former for mixing the images to thereby achieve elimination of shaking and reduction of noise. At this time, the CPU 14A changes the threshold value Th according to whether the output level of each pixel of the short time exposed image is large or small.

By this configuration, the imaging device 10A can generate an image having no shaking and suppressed in noise more by a small number of images of different exposure conditions.

More concretely, as explained before, the CPU 14A has a correction function of detecting and correcting amounts of shaking among a plurality of images captured under different exposure conditions and a mixing function of taking a difference for each pixel from a first image and a second image corrected in positional deviation, judging that pixel as the edge of the image and raising the mixing ratio of the first image when the value for each pixel exceeds a threshold value determined related to the output level of that pixel of the first image, and raising the mixing ratio of the second image to mix the images when the value for each pixel is the threshold value or less.

The CPU 14A corrects positional deviations among a plurality of captured images, then extracts the Gr components from the RAW pixel data of the plurality of images and takes the difference and separates the edge and shaking components and noise components from the difference image according to the threshold value.

The CPU 14A calculates the absolute value of the difference image of the images (short time exposed image S1—long time exposed image S2) subjected to the correction processing of the positional deviation.

This image is formed by subtracting the image of the long time exposure having shaking from the image of the short time exposure, therefore an image of the edges including noise and shaking will be generated.

The CPU 14A raises the ratio of the image of the long time exposure having little noise according to the increase of the distance from an edge and sets the edge portion so that the ratio of the image of the short time exposure having a high resolution becomes larger.

For example, the ratio of the image of the short time exposure may be set at 100% at the edge portion and in the vicinity of the edge, the ratio of the image of the long time exposure may be stepwise raised according to the distance from the edge, and a 50% ratio each may be given to the long time exposed image and the short time exposed image in the noise portion.

Furthermore, the CPU 14A raises the ratio of the short time exposed image to mix the images when the distance from the edge is shorter than a distance set in advance and raises the ratio of the long time exposed image to mix the images when the distance from the edge is longer than the distance set in advance.

The CPU 14A stores the image data after the processing in the memory 15.

Figure 7:
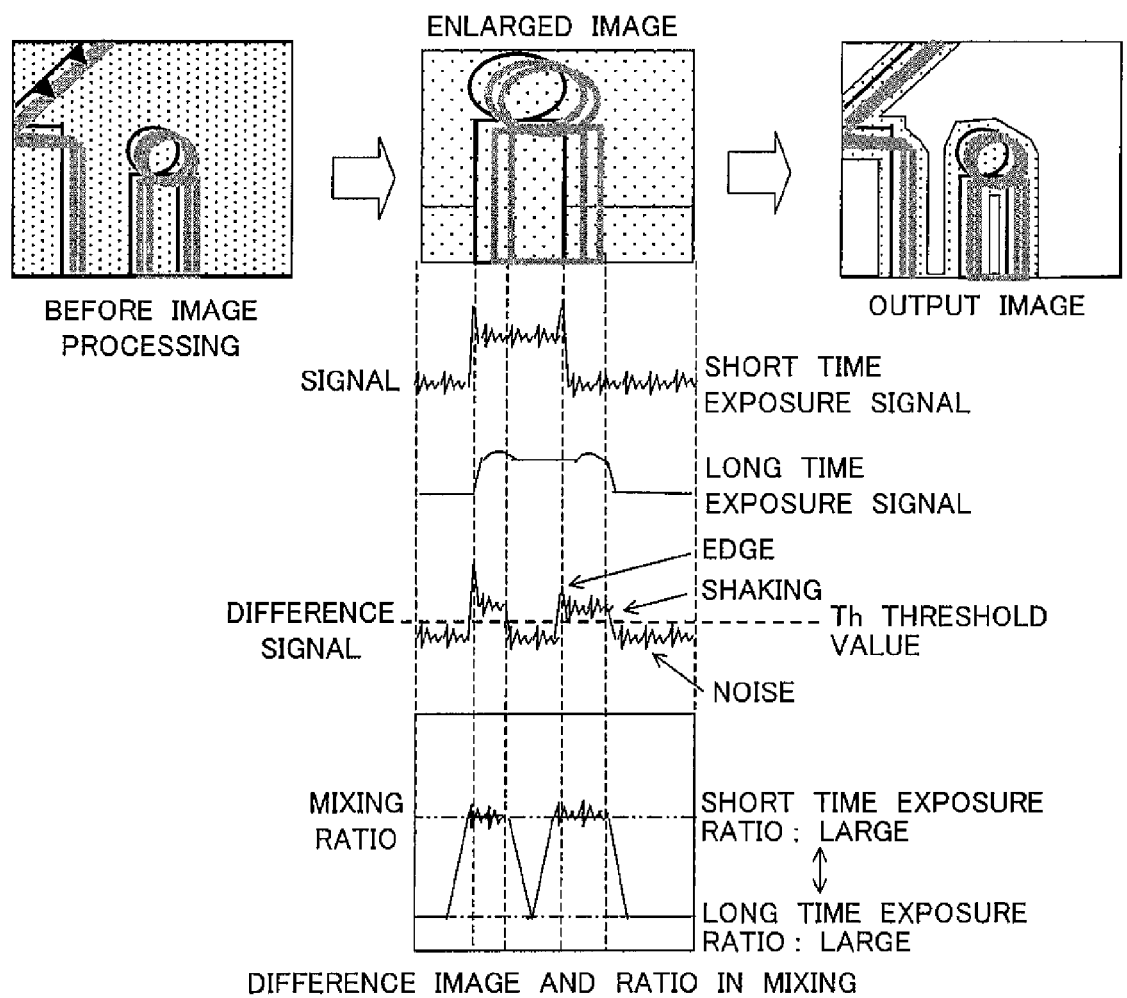
[FIG. 7]

FIG. 7A to FIG. 7C are diagrams showing relationships between the difference image and the ratio in the mixing in the second embodiment, in which FIG. 7A shows an image before noise reduction processing, and FIG. 7B shows an image obtained by enlarging the object portion, and FIG. 7C shows the output image.

FIG. 7A to FIG. 7C are images formed by enlarging the object portion of FIG. 3.

As shown in FIG. 7B, the edge and/or shaking and noise components remain in the difference image. When away from an edge by a predetermined distance or more, there is relatively little change in the image.

As explained for FIG. 3, the difference image becomes an image where the edges and noise by the short time exposure and the shaking by the long time exposure are extracted. This is separated for each pixel according to a threshold value Th set in advance. A pixel having a signal larger than the threshold value is judged as an edge and/or shaking, whereupon the mixing ratio of the short time exposure is made larger.

A pixel having a signal smaller than the threshold value Th is judged as noise, whereupon the mixing ratio of the long time exposure is made larger. The mixing ratios are set for the individual pixels and the two images are mixed based on those ratios. Noise easily stands out at a uniform surface of the background, but by performing this processing, the noise can be reduced.

In actuality, however, the extent of variation of the output level due to noise differs between a bright portion and a dark portion in an image. The extent of the variation is large in a bright portion, while the extent of the variation is relatively small in a dark portion.

Accordingly, when the threshold value Th described above was uniform, the noise component could be separated at a dark portion, but sometimes ended up being regarded as an edge in a bright portion.

For example, on a uniform surface such as a bright wall, the value of the difference image exceeds the threshold value, so the noise is regarded as an edge, whereby the mixing ratio of the short time exposure is set high. Therefore, the noise reduction effect cannot be exhibited.

In the second embodiment, this problem is solved by considering the magnitude of the output level at each pixel of the image and changing the threshold value according to the magnitude.

Figure 8:
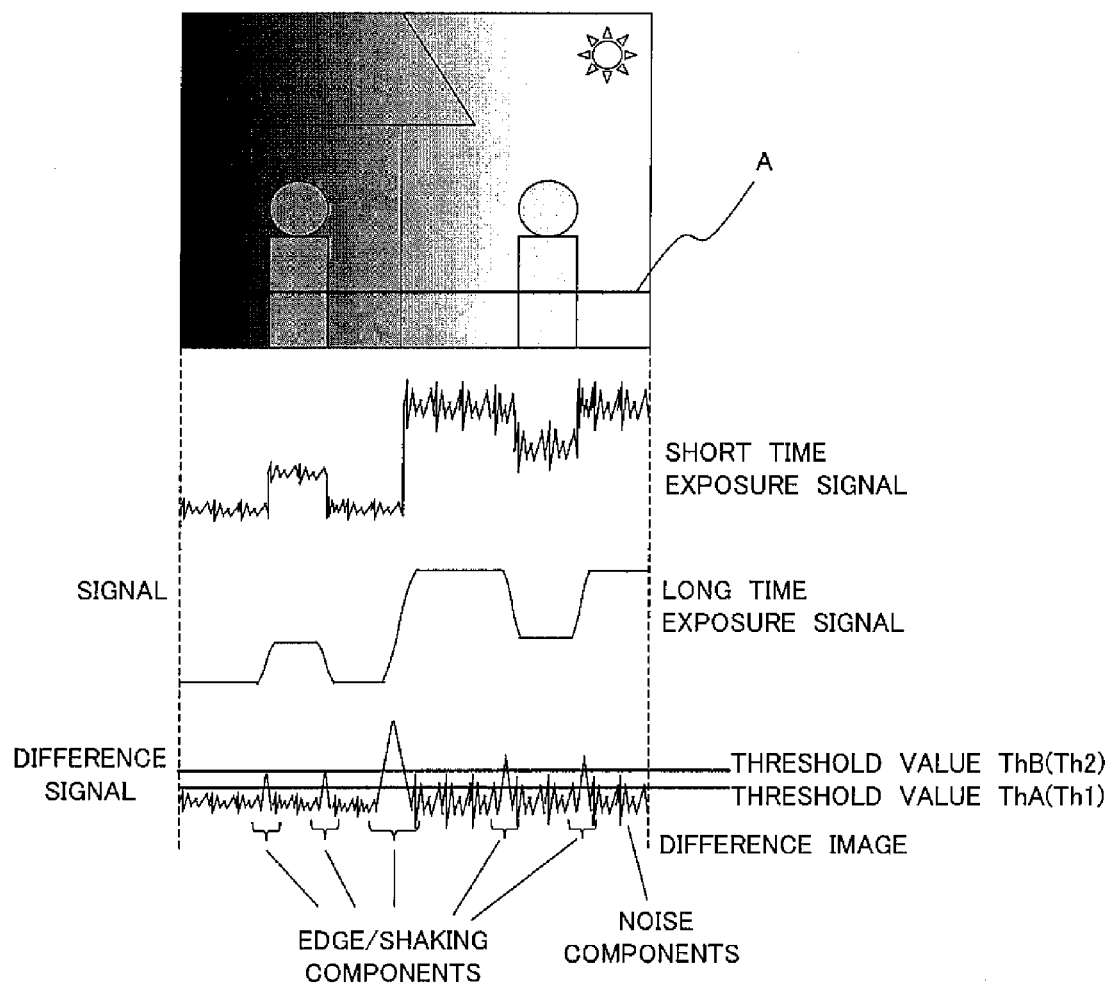
[FIG. 8]

FIG. 8 is a diagram showing an example of the case where there are a bright portion and a dark portion in the image, for example, the sun and a shadow.

When looking at the image data on a line A in FIG. 8, the extent of the variation due to the noise is large in the bright portion, while the extent of the variation is small in the dark portion.

When taking the difference between the image of the short time exposure having much noise and the image of the long time exposure where shaking occurs, the edge and/or shaking components and the noise components remain.

When setting the mixing ratio by the difference image, if a threshold value ThA is uniformly applied, the noise of the dark portion can be suppressed, but the noise component cannot be completely separated in the bright portion, and the mixing ratio of the short time exposure is set high.

Further, when a ThB larger than the threshold value ThA is applied, even the noise component of the bright portion can be suppressed, but even the edge and/or shaking components end up being cut away. In this case, the shaking cannot be completely eliminated.

Therefore, the second embodiment is characterized in that the threshold value is changed according to the magnitude of the data of the pixel with reference to the short time exposed image (first image).

For example, here, assume the output of the short time exposed image (a case where the RAW data has 10 bits) is divided into 0 to 2047 and 2048 to 4095.

Assume the threshold value is set to Th1 in the former case, and the threshold value is set to Th2 in the latter case. At this time, the values are set so that Th1<Th2.

When setting the mixing ratio for each pixel by the difference image, the output of the target pixel in the short time exposed image is referred to. The threshold value is set to Th1 when that value is 2047 or less. A data x of the target pixel of the difference image and Th1 are compared. When x>Th1, the mixing ratio of the short time exposed image is made higher, while when x<Th1, the mixing ratio of the long time exposure is made higher.

On the other hand, the threshold value is set to Th2 when the value of the target pixel in the short time exposed image is 2048 or more, the mixing ratio of the short time exposed image is made high when x>Th2, and the mixing ratio of the long time exposure is made high when x<Th2.

This processing is carried out with respect to all pixels of the difference image. After the mixing ratios are set, the images are mixed according to those ratios. Here, the threshold value was divided into two values in accordance with the output of the short time exposed image, but it may also be divided into three or more values.

Figure 9:
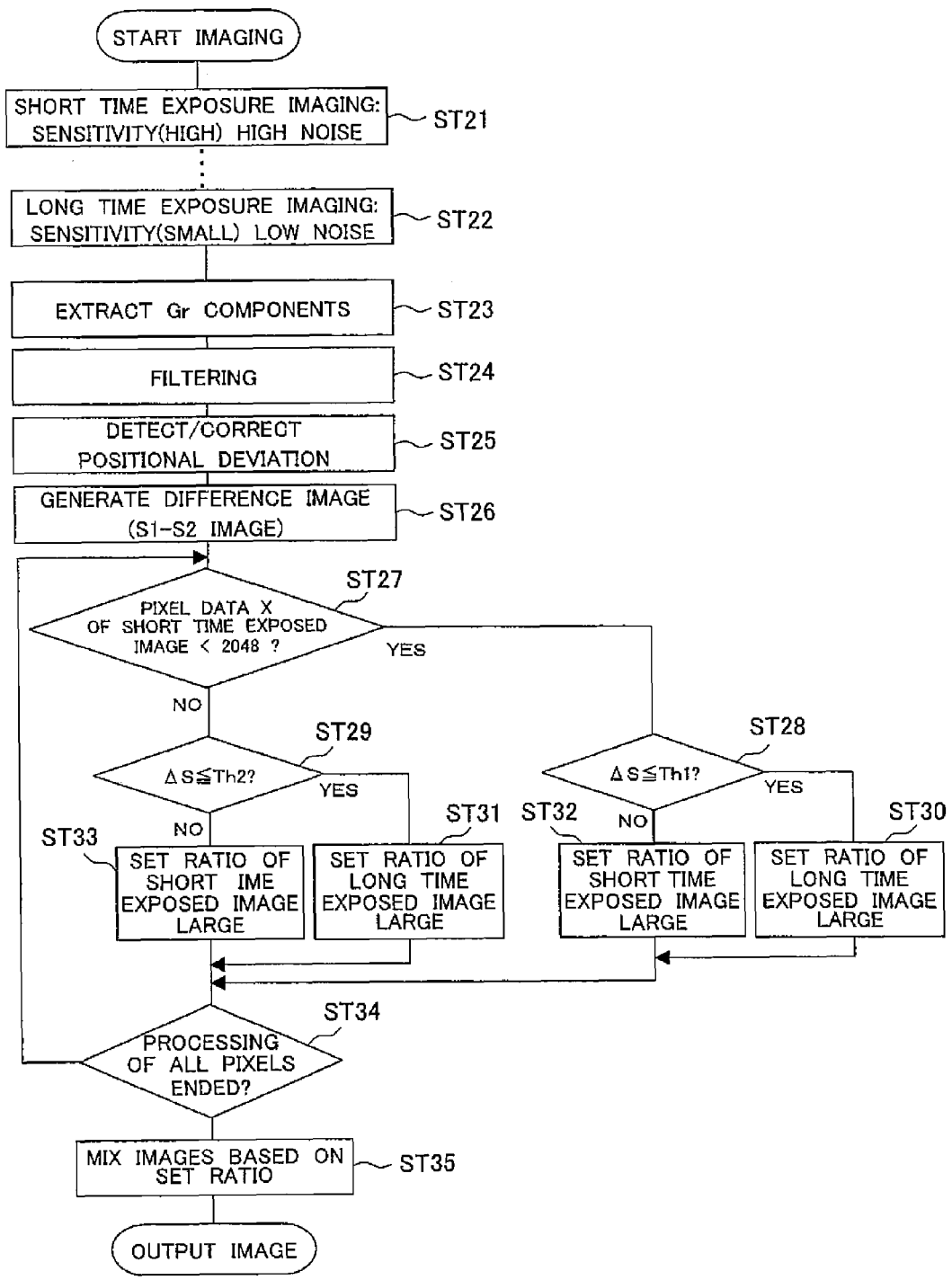
[FIG. 9]

Next, the operation by the above configuration will be explained with reference to the flow chart of FIG. 9.

First, under the control of the CPU 14, the optical system 11 and the imaging element 12 are driven for capturing images. At step ST1, the picture is taken by short time exposure in a state where the CCD sensitivity is high, that is, the noise is large, but the shutter speed is fast.

Next at step ST22, the CCD sensitivity is changed for capturing an image having little noise, but having a long exposure time.

At step ST23, the Gr components are extracted from the imaging data. At step ST24, the signal is filtered to eliminate the noise components. The filtering is carried out with a filter coefficient for reducing the noise component without lowering the resolution. As the filtering, in general there are a median filter, an edge preservation filter, etc.

Next, at step ST25, the positional deviation of each image processed at step ST24 is detected and corrected. Here, the method of detecting and/or correcting the deviation is not an issue.

At step ST26, an absolute value of the difference image of the images (short time exposed image S1—long time exposed image S2) subjected to the positional deviation correction processing is calculated. This image is obtained by subtracting the long time exposed image having shaking from the short time exposed image, therefore an image of edges including noise and shaking will be generated.

The mixing ratio is set for each pixel by using the difference image.

Furthermore, at step ST27, it is judged whether the target pixel data x of the short time exposed image is 2047 or less or 2048 or more is carried out. Th1 or Th2 is used as the threshold value in accordance with that judgment result.

In the former case (2047 or less), at step ST28, the value ΔS of the target pixel of the difference image and the set threshold value Th1 are compared. On the other hand, in the latter case (2048 or more), at step ST29, the value ΔS of the target pixel of the difference image and the set threshold value Th2 are compared.

If ΔS is smaller than Th1 or Th2, the mixing ratio of the long time exposure is set higher (ST30, ST31). Contrary to this, if ΔS is larger than Th1 or Th2, the mixing ratio of the short time exposure is set higher (ST32, ST33).

At step ST34, this ratio is set for all pixels. At step ST35, the two images are mixed based on this ratio.

This ratio is set for all pixels (ST34), and the two images are mixed based on this ratio (ST35).

Note that, in the second embodiment as well, the threshold value Th can be changed according to the gain magnification with respect to the image signal determined from the exposure conditions when capturing an image.

This means changing the value of the threshold value Th according to the gain magnification for the signal of the sensor set at the time of the imaging.

With a dark object or the like, the ISO sensitivity at the time of the imaging is set high, and the gain magnification with respect to the output of the sensor becomes high. The higher the gain, the larger the noise. Therefore, the separation threshold value of an edge and noise by the difference image is changed corresponding to the gain magnification.

Note that, in the second embodiment, the case where two images were mixed was explained, but three or more images may be mixed as well. For example, in the case of mixing three images, the ratio in the mixing may be set according to the distance from an edge in accordance with the exposure conditions.

Note that in the above explanation, according to the second embodiment, by separating the edges and/or shaking and the noise by the difference image from a plurality of images captured under different exposure conditions and changing the mixing ratio according to a threshold value, a noise reduction effect can be achieved, and images can be captured dealing with even positional deviation between captured images and shaking. In contrast to the prior art, great effects are obtained, for example, the reduction of the required memory capacity, the shortening of the processing time, the securing of space for mounting parts, and the reduction of cost.

Note that, in the above explanation, the mixing is carried out with respect to the output (RAW data) of the RGB Beyer pattern from the imaging element (sensor), but it can also be applied to a case where a luminance signal Y in the YUV format after the signal processing of the captured image is used for the image mixing.

In this case, the CPU 14 and CPU 14A are configured so as to, in for example the correction function, calculate the difference of luminance signals Y by capturing operations under different exposure conditions processed in the signal processing unit 13 (short time exposed image YS–long time image exposure YL) and detect the positional deviation and amount of shaking. This image is obtained by subtracting the image of the long time exposure having shaking from the image of the short time exposure, therefore an image of the edges including shaking will be generated.

The YUV format of the captured image will be explained next.

The signals handled by this format are the luminance signal Y, the color difference signal U, and the color difference signal V.

Among these signals Y, U, and V, the Y signal component exerts a great influence as the element determining the resolution.

The human eye is relatively insensitive to relative color information such as with compression by reducing color difference signals as in the principle of image compression such as in the JPEG. Therefore, a large effect of reduction of noise can be achieved by image mixing of the luminance signal Y.

In this case, by eliminating noise by only the Y component among Y, U, and V, a shortening of the processing time is achieved.

Further, in the present embodiment, positional deviations and shaking are extracted from the difference image of a plurality of images, but it is also possible to detect a correct amount of deviation by pattern matching or the like and change the mixing ratio.

INDUSTRIAL APPLICABILITY

In the imaging device and the imaging method of the present invention, an image having no shaking and suppressing the noise can be obtained by a small number of images under different exposure conditions, and it is possible to shorten the processing time, therefore the invention can be applied to a digital still camera, a camera mounted in a mobile phone, a camera mounted in a portable electronic device, and so on.

The invention claimed is:

1. An imaging device having a function of mixing a plurality of images captured under different exposure conditions, comprising:
   a detecting means configured for detecting positional deviations and amounts of shaking among the plurality of images, and
   a mixing means configured for measuring a difference in the pixels from a first image and a second image corrected in positional deviation based on detection results of the detecting means and the difference in a corresponding pixel at an edge of the respective images and increasing a mixing ratio of the first image to the second image when the difference value exceeds a threshold value set in advance and lowering the mixing ratio of the first image to the second image when the difference value is at or below the threshold value.

2. An imaging device as set forth in claim 1, wherein at least one among the plurality of images to be mixed includes an image having noise and a high resolution.

3. An imaging device as set forth in claim 1, wherein at least one among the plurality of images to be mixed includes an image having a low resolution, but having little noise.

4. An imaging device as set forth in claim 1, wherein the threshold value set in the mixing means can be changed according to a gain magnification with respect to an image signal determined from the exposure conditions when capturing the image.

5. An imaging device as set forth in claim 1, wherein the mixing means mixes images based on at least a G component in data of output of the imaging element.

6. An imaging device as set forth in claim 1, wherein the mixing means mixes images based on at least a luminance signal among a luminance signal Y and color difference signals U and V.

7. An imaging device as set forth in claim 1, wherein the detecting means extracts positional deviations and amounts of shaking among images from a difference image of a plurality of images.

8. An imaging device as set forth in claim 1, wherein the mixing means makes the ratio of the image exposed for a long time and having little noise larger according to an increase of a distance from the edge and sets an edge portion so that the ratio of the image exposed for a short time and having a high resolution becomes larger.

9. An imaging device as set forth in claim 8, wherein the mixing means mixes images by increasing the ratio of the short time exposed image when the distance from the edge is shorter than a distance set in advance.

10. An imaging device as set forth in claim 8, wherein the mixing means mixes images by increasing the ratio of the long time exposed image when the distance from the edge is longer than a distance set in advance.

11. An imaging device as set forth in claim 1, wherein the mixing means takes a difference for each pixel from the first image and the second image corrected in the positional deviation, judges that pixel as the edge of the image and raises the mixing ratio of the first image when the value for each pixel exceeds the threshold value determined concerned with the output level of the related pixel of the first image, and raises the mixing ratio of the second image when the value for each pixel is the threshold value or less for mixing the images, and the first image includes an image having noise, but having a high resolution.

12. An imaging device as set forth in claim 11, wherein: the second image includes an image having a low resolution, but having little noise.

13. An imaging device as set forth in claim 11, wherein the mixing means raises the ratio of the second image of the long time exposure according to the increase of the distance from the edge, and sets the edge portion so that the ratio of the first image of the short time exposure becomes large.

14. An imaging device as set forth in claim 13, wherein the mixing means raises the ratio of the first image to mix the images when the distance from the edge is shorter than a distance set in advance.

15. An imaging device as set forth in claim 13, wherein the mixing means raises the ratio of the second image to mix the images when the distance from the edge is longer than a distance set in advance.

16. An imaging device as set forth in claim 11, wherein: the detecting means extracts the amount of shaking among images from a difference image of a plurality of images and corrects the positional deviation based on the detection result.

17. An imaging method for mixing a plurality of images captured under different exposure conditions, comprising:
   detecting positional deviations and amounts of shaking among the plurality of images,
   measuring a difference in the pixels from the first image and the second image corrected in positional deviation based on the detection results,
   comparing the difference value and a threshold value set in advance, in a corresponding pixel at an edge of the respective images,
   increasing the mixing ratio of the first image to the second image when the difference value exceeds the threshold value and lowering the mixing ratio of the first image to the second image when the difference value is at or below the threshold value, and
   mixing images at the determined mixing ratio.

* * * * *